INVENTOR
Gordon L. Hammond

United States Patent Office 3,486,433
Patented Dec. 30, 1969

3,486,433
SELF-COCKING HIGH-SPEED GATING SHUTTER
Gordon L. Hammond, Hyattsville, Md., assignor to the United States of America as represented by the Secretary of the Navy
Filed July 21, 1966, Ser. No. 566,955
Int. Cl. G03b 9/36; G02f 1/30
U.S. Cl. 95—55           9 Claims

ABSTRACT OF THE DISCLOSURE

A high-speed camera shutter having a movable electroconductive elongate leaf secured at both ends to a fixed elongate electroconductive bar. Upon application of an electrical energy impulse to the securing means a repulsive force is generated between the bar and leaf effecting reciprocatory movement of the leaf and an apertured extension within a guideway thereby to interrupt or pass a light beam.

---

This invention relates to a high-speed shutter mechanism for spectrographic applications. More particularly, the invention relates to an improved high-speed electromechanical gating shutter of a character providing for shutter return or recocking between successive portions of the actuation cycle thereof.

Normally, the movable portion of the shutter mechanism is disposed in a manner to interrupt a light beam impinging thereon. Upon actuation and during the entire cycle of operation, it moves in a path which during conditions wherein the shutter is open, passes the light beam onto a spectrograph or other optical instrument, as the case may be, and further permits the beam to pass only for a short interval of time, before which, and after which, the beam is completely blocked.

Prior art shutter mechanisms of the general character to which the instant invention relates are shown by way of example in U.S. Patent No. 3,049,982, issued to Paul A. Kendall and U.S. Patent 3,122,080 which issued to John C. Camm. The apparatus described in the former patent functions to effect a chopping of the light beam by moving a slotted plate across the beam path. The shutter is unidirectional in operation from the standpoint of initiation thereof and hence must be repositioned by hand after each actuation cycle before it is in condition for a subsequent firing or actuation cycle. It has been found that the repositioning of shutters of this character has resulted in occasional non-reproducible behavior. Non-reproducible behavior of devices of this character is reduced to some degree by the improvement incorporated in U.S. Patent application of Paul A. Kendall, Ser. No. 468,173, filed June 29, 1965 for invention entitled "High-Speed Electromechanical Shutter for Spectrographs." It is to be noted, however, that the plate of the aforementioned improved shutter mechanism has to be repositioned by hand after each actuation cycle. Moreover, the improved type of device is not readily adaptable to applications with spectrographs because the requirement of small mass shutter plates, for rapid action actuation thereof, dictates that the distance from driving element to plate slot be a minimum. The plate mass of the improved device would require alterations to the extent that the mass would have to be tripled in magnitude in order to be readily incorporated in an apparatus for use with a typical commercial spectrograph.

Other high speed devices for interrupting a light beam and of a character known in the prior art have included explosively driven slotted plates, bleachable filters and Kerr cells. The explosively driven type devices require rebuilding, or in the alternative the insertion of a new explosive charge or cartridge after each actuation, while the bleachable filters and Kerr cell devices insert or position non-linear absorbing material into the light beam, thus adversely effecting the light beam transmission characteristics of the shutter when in the fully open condition thereof.

It is a feature of the instant invention to provide an improved electrically actuated mechanical shutter device having a minimum of moveable parts, and wherein the mass of the moveable parts are of low mass material, thereby facilitating high acceleration of a moveable plate wherein provision is made for recocking of the shutter following an actuation thereof.

One object of the instant invention resides in the utilization of an electrical control circuit of a character providing a high energy substantially instantaneous, current pulse of a character provided by a capacitor discharge type circuit for electromagnetically inducing actuation of an improved shutter gate in a manner providing high speed actuation and automatic recocking as a part of a complete operational cycle thereof.

Another object of the invention resides in providing a low mass shutter and gating structure of a character providing both open and closed sequential cycles during an actuation to expose and gate or attenuate a light beam during operation thereof.

In correlation with the foregoing object it is a further object to provide an improved electric current operated shutter in which an initial change of shape of the actuating portion or member of the shutter drive mechanism occurs during current pulse flow and accomplishes a shutter actuation and a subsequent recocking function, with the latter function occurring upon the return of the shutter actuating drive element to its initial shape by its subsequent change of a snap like spring action nature thereof with current pulse decay therethrough.

A further object of the invention is to provide an improved high speed shutter mechanism of a character incorporating a substantially free moving shutter plate in which shutter arresting action is accomplished by the shutter actuating member, thereby obviating the necessity for additional arresting mechanism of the character required of devices of the prior art.

In correlation with the immediately foregoing object it is a further object to provide for deceleration and arresting action action of the improved shutter plate by utilization of spring constant characteristics of the material as well as a mutually cooperative configuration of the elements thereof.

A further object of the instant invention is to provide an improved gating shutter mechanism of a character providing a self recocking action, wherein all of the desirable features of apparatus of the prior art are provided, for substantially eliminating all of the aforementioned shortcomings thereof.

Other objects and many of the attendent advantages of this invention will be readily apparent to one skilled in the art when considered with relation to the following detailed description when taken in conjunction with the accompanying drawings wherein:

FIG. 4 is an isometric view of the shutter gating member of the shutter mechanism.

Figure 1:
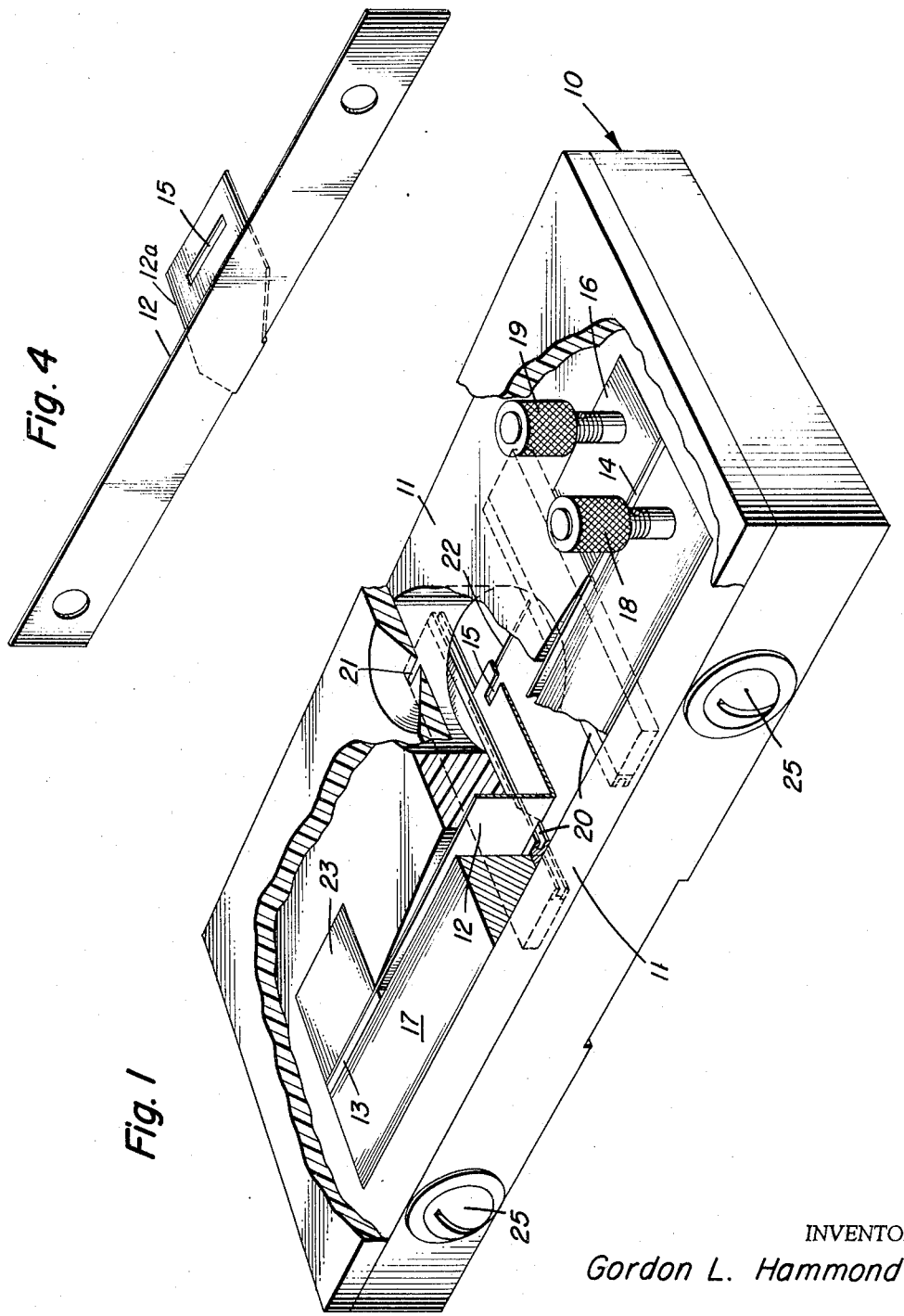
FIG. 1 is a fragmentary perspective view with portions broken away and in section of a gating type shutter mechanism of a preferred embodiment of the instant invention.

Referring now to the drawings wherein like reference characters refer to like parts throughout the various figures, the improved shutter mechanism is generally indicated at 10. The mechanism comprises a base member 11, a thin leaf spring shutter gate member 12 having a member 12a extending substantially perpendicularly and centrally therefrom, FIG. 4, spacers 13 and 14, and conductor blocks 16 and 17, the latter having suitable terminals 19 and 18 respectively for connection into a firing circuit of a character disclosed in the U.S. patent application of Paul A. Kendall, Ser. No. 468,173 filed June 29, 1965 for High-Speed Electromechanical Shutter for Spectographs.

The base member 11 incorporates a plurality of guideways 20 for controlling movement of the shutter gate member 12 along a path which is intercepted by the slot 21 and recess 22, which in effect defines together with aperture 15 formed in member 12a of movable gate 12, the path of the portion of the optical beam to be passed or intercepted by light from a light source, not shown, as utilized with a spectrograph, also not shown. The conductor blocks 16 and 17 are separated by the insulating spacer 14.

The shutter gate member 12 is disposed in electrical contact with block 16, which in turn is electrically connected to terminal 19.

The opposite end of the shutter gate 12 is in electrical contact with the metallic electroconductive spacer 13 and metalic block 23.

Figure 2:
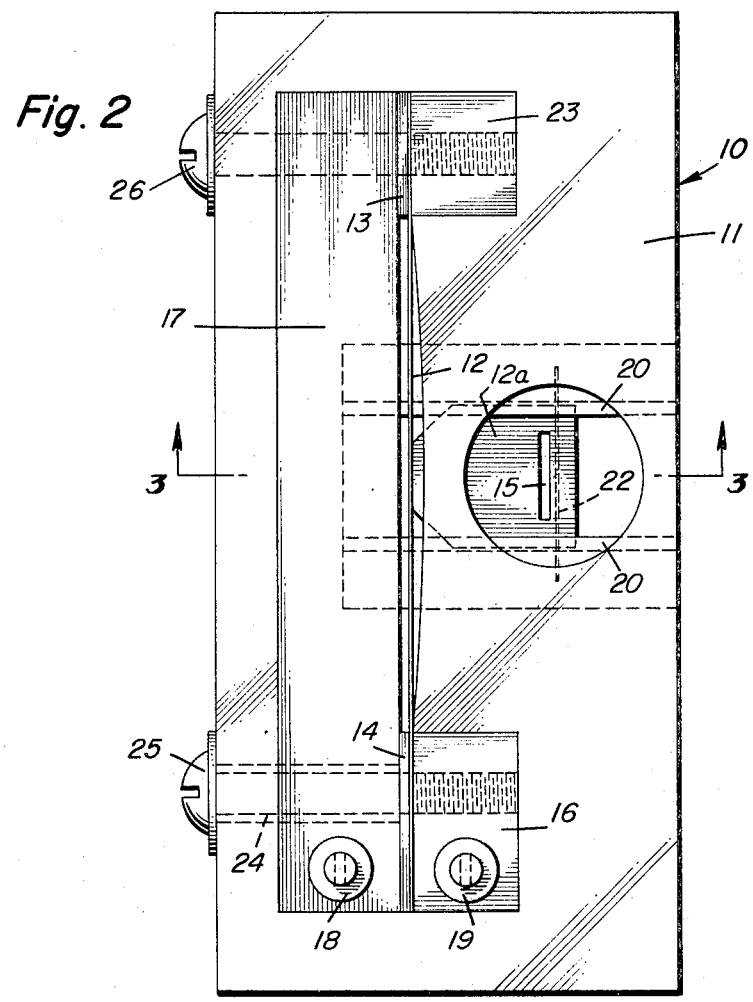
FIG. 2 is a plan view sans cover of the shutter mechanism of FIG. 1.
Figure 3:
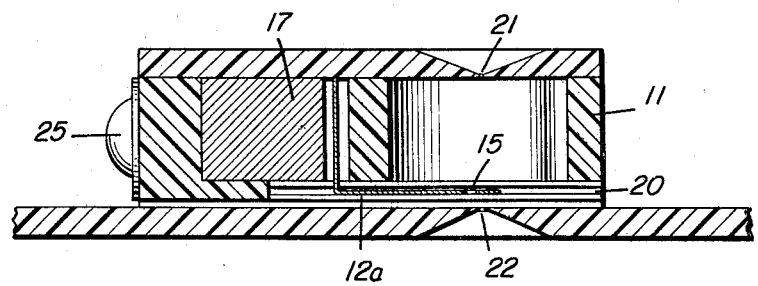
FIG. 3 is a side elevation view in section and taken along the line 3—3 of FIG. 2, and including a cover.

Referring to FIG. 2, an insulating sleeve 24 is shown disposed about machine screw 25, which maintains the assembled relationship of block 16 and 17 together with spacer 14 within the base member 11. Machine screw 26, which fixes the assembled relationship of block 17, spacer 13, gate member 12 and block 23 within base member 11 is not electrically insulated from the parts with which it is associated.

In order to operate the device in its intended manner the terminals 18 and 19 are connected to a pair of bus bars or conductor legs of trigger controlled capacitor discharge circuit of the character disclosed in the Kendall application supra. Upon actuation of the trigger circuit the discharge current, normally stored in the capacitor is caused to flow for example, from the high potential leg of the capacitor circuit to terminal 18, through the conducting bar 17, spacer 13 to the upper end of shutter member 12, and thence through terminal block 16 and terminal 19 to the return or low potential leg or bus bar of the electrical capacitor discharge circuit. The current pulse which passes through the aforementioned conductive path functions by virtue of the direction of current flow, respectively, in the conductive bar and the shutter gate member 12 to produce flows therethrough which are in opposite directions, hence a repulsion effect occurs between the fixed member and the gate member which has an intermediate portion which is not constrained against movement. The repulsion effects a displacement of the intermediate portion which constitutes the shutter gate and causes it to uncover the aperture for a brief period of time commensurate to the energy level of the electrical impulse and time lag effect of the beryllium copper material of gate member 12. Thereafter, upon termination of the pulse from the external electrical circuit, the decay of current pulse flow results in the restoration of the spring like member 12 to its initial position, thereby closing the light aperture and recocking the shutter for subsequent actuation by the triggering circuit.

Obviously many modifications and variations of the present invention are possible in the light of the above teachings. It is therefore to be understood that within the scope of the appended claims the invention may be practised otherwise than as specifically described.

What is claimed is:

1. A cyclically operative high-speed shutter mechanism comprising
    a housing having at least one light beam transmitting aperture formed therein,
    an elongate electro-conductive element disposed in said housing,
    a movable elongate electro-conductive elongate element disposed in contiguous mutually spaced adjacency from said first recited element and having an apertured member extending therefrom,
    means for securing together said first and second recited elements at the extremities thereof,
    guideway means for supporting said extending member for reciprocatory movement to pass or interrupt a light beam transmitted through said light beam transmitting aperture, and
    means for effecting an energizing electrical pulse flow serially through said elements such that the current flow is in opposite directions in said elements for inducing a repulsion force between said elements to thereby effect reciprocatory movement of said extending member.

2. A mechanism of the character of claim 1 further characterized by said movable element being composed of a material characterized by displaying spring like activity, wherein decay of the energizing electrical pulse facilitates recocking of said movable element for a subsequent actuation cycle in further response to such spring action.

3. The mechanism of the character of claim 2 wherein said movable element is composed of a material from a group displaying essentially the same physical and electrical characteristics as beryllium copper.

4. The combination with the mechanism of claim 3 of a spectroscope.

5. The combination of claim 4 further including a source of artificial light.

6. The structure of claim 5 wherein the light beam from said source of light is collimated.

7. A mechanism according to claim 1 wherein said securing means provides an electro-conductive path at only one of the extremities of said first and second recited elements.

8. A mechanism according to claim 7 wherein one of said securing means includes a spacer made of electro-conductive material and another of said securing means includes a spacer made of non-electro-conductive material.

9. A mechanism according to claim 1 wherein said apertured member extends substantially perpendicularly to the longitudinal dimension of said elongate element and intermediate of the extremities thereof.

References Cited

UNITED STATES PATENTS

| 3,049,982 | 8/1962 | Kendall | 95—55 |
| 3,158,350 | 11/1964 | Fulbright | 350—270 X |

JOHN M. HORAN, Primary Examiner

U.S. Cl. X.R.

350—270